US008227732B2

(12) United States Patent
Kito et al.

(10) Patent No.: US 8,227,732 B2
(45) Date of Patent: Jul. 24, 2012

(54) LIGHT SOURCE DEVICE HAVING A POWER SUPPLY ANTENNA DISPOSED AT ONE FOCAL POINT OF AN ELLIPTICAL RESONATOR, AND PROJECTOR

(75) Inventors: Satoshi Kito, Chino (JP); Junichi Suzuki, Chino (JP); Norio Imaoka, Takamori-machi (JP); Satoshi Fujii, Sanda (JP)

(73) Assignee: Seiko Epson Corporation, Tokyo (JP)

( * ) Notice: Subject to any disclaimer, the term of this patent is extended or adjusted under 35 U.S.C. 154(b) by 415 days.

(21) Appl. No.: 12/637,503

(22) Filed: Dec. 14, 2009

(65) Prior Publication Data

US 2010/0214542 A1 Aug. 26, 2010

(30) Foreign Application Priority Data

Feb. 25, 2009 (JP) ................................ 2009-042300

(51) Int. Cl.
*G01J 1/32* (2006.01)

(52) U.S. Cl. ........................................ 250/205; 353/85

(58) Field of Classification Search .................. 250/205, 250/239, 208.1; 353/122, 75, 85–87; 315/34–39, 315/248; 362/296.06
See application file for complete search history.

(56) References Cited

U.S. PATENT DOCUMENTS 5,420,390 A * 5/1995 Abe ........................ 219/121.36
2005/0286263 A1 12/2005 Champion et al.
2007/0071524 A1 3/2007 Nakamura

FOREIGN PATENT DOCUMENTS

JP A-2005-038751 2/2005
JP A-2007-102194 4/2007
JP A-2007-115534 5/2007
JP A-2008-504651 2/2008

* cited by examiner

*Primary Examiner* — Que T Le
(74) *Attorney, Agent, or Firm* — Oliff & Berridge, PLC

(57) ABSTRACT

A light source device includes an elliptical resonator, an electric discharge lamp that has an electric discharge tube and an electrode connected to the electric discharge tube and is disposed at one of two confocal points of the elliptical resonator, and a power supply antenna that supplies a microwave to the electric discharge lamp and is disposed at the other confocal point.

14 Claims, 4 Drawing Sheets

LIGHT SOURCE DEVICE HAVING A POWER SUPPLY ANTENNA DISPOSED AT ONE FOCAL POINT OF AN ELLIPTICAL RESONATOR, AND PROJECTOR

CROSS-REFERENCE TO RELATED APPLICATION

This application is based on and claims priority from Japanese Patent Application No. 2009-042300, filed on Feb. 25, 2009, the contents of which are incorporated herein by reference.

BACKGROUND

1. Technical Field

The present invention relates to a light source device and a projector.

2. Related Art

Heretofore, a light source device having an electrodeless lamp has been known as a light source device used for a projector. In such an electrodeless lamp, a pair of waveguide bodies made of metallic wires is provided in an electric discharge tube in which a light emitting material that emits light by an electromagnetic field of microwaves is encapsulated, and the light is emitted by concentrating the electromagnetic field generated at a gap between both ends of the waveguide bodies. JP-A-2007-115534 (patent document 1) is an example of the related art. By generating the light at the gap between the waveguide bodies, electric power can be efficiently transmitted and the advantage is achieved that a light emission volume can be reduced since the light emission is taken place at the gap. However, in an actual case, there is a problem that the waveguide body acts as an antenna so that the light emission efficiency at the gap is not improved or the emission of light is not stable.

Meanwhile, some lamps in which an electromagnetic field is concentrated by using a cylindrical resonator are proposed. For example, JP-A-2007-102194 (patent document 2) discloses a structure of a device in which a lamp having a discharge concentrator is disposed in a resonating cavity and electromagnetic energy is supplied to the resonating cavity.

In the device described in the patent document 2, leakage of the electromagnetic energy is prevented by the resonance cavity. However, since the device is structured such that the electromagnetic energy is not forcedly concentrated to the discharge concentrator, the energy is wasted. Therefore, in a case where light is emitted by a lamp by using a resonator, it is important to use a method for efficiently concentrating microwaves.

SUMMARY

An advantage of the invention is to provide a light source device stably emitting light with high intensity and a projector that are realized by efficiently concentrating microwaves to an electric discharge section.

A light source device according to a first aspect of the invention includes an elliptical resonator, an electric discharge lamp that has an electric discharge tube and an electrode connected to the electric discharge tube and is disposed at one of two confocal points of the elliptical resonator, and a power supply antenna that supplies a microwave to the electric discharge lamp and is disposed at the other confocal point.

With the above configuration, since the electric discharge lamp is disposed at one of the two confocal points and the power supply antenna for supplying the microwave is disposed at the other confocal point, the microwave radiated in the elliptical resonator from the power supply antenna is resonated in the inner section of the resonator, and is concentrated to one of the confocal point, i.e., the electric discharge lamp, thereby allowing the electric discharge lamp to emit light by the concentrated microwave. Thus, the microwave is efficiently concentrated to the electric discharge lamp so that it is possible to improve the usage efficiency as compared to a structure having an existing cylindrical resonator. Consequently, it is possible to obtain emission light with higher intensity even by energy having a level the same as heretofore. Moreover, the electric discharge can be stabilized so that the emission condition more stable than heretofore can be obtained.

In addition, in the light source device according to the first aspect of the invention, it is preferable that a radiation exit for radiating emission light of the electric discharge lamp to the outside of the elliptical resonator be formed on a wall portion of the elliptical resonator. With this configuration, it is possible to efficiently output the emission light of the electric discharge lamp to the outside.

Further, in addition, the light source device according to the first aspect of the invention, further includes a reflection mirror that reflects the emission light of the electric discharge lamp, and is provided in the elliptical resonator. With this configuration, since the emission light radiated in a direction different from a direction toward the radiation exit in the emission light emitted from the electric discharge lamp, can be reflected toward the radiation exit by the reflection mirror, the usage efficiency of the light can be enhanced so that emission of light with high intensity can be obtained.

Further, in addition, in the light source device according to the first aspect of the invention, it is preferable that the reflection mirror be formed in a cone shape so as to be opened toward the electric discharge lamp and the radiation exit. With this configuration, since the reflection mirror is formed in a cone shape so as to be opened toward the electric discharge lamp and the radiation exit, the emission light of the electric discharge lamp is radiated from the radiation exit as convergence light in such a manner that the radiation directions of beams of the emission light are aligned so that it is possible to obtain a point light source with high intensity.

Further, in addition, in the light source device according to the first aspect of the invention, it is preferable that the reflection mirror be disposed at the same confocal point as that of the power supply antenna. With this configuration, while the microwave supplied from the power supply antenna disposed at the one confocal point of the elliptical resonator is concentrated to the electric discharge lamp disposed at the other confocal point, the emission light of the electric discharge lamp is concentrated to the confocal point where the power supply antenna is disposed. As a result, by placing the reflection mirror at the same confocal point as that of the power supply antenna, the emission light of the electric discharge lamp concentrated to the confocal point can be reflected to a desired direction.

Further, in addition, in the light source device according to the first aspect of the invention, it is preferable that the radiation exit be formed on the wall portion at the same confocal point as that of the reflection mirror and the power supply antenna, and the reflection mirror have a tapered reflection face for reflecting the emission light toward the radiation exit. With this configuration, the emission light of the electric discharge lamp concentrated to the same confocal point as that of the reflection mirror and the power supply antenna, can be surely reflected toward the radiation exit by the tapered reflection face of the reflection mirror.

Further, in addition, in the light source device according to the first aspect of the invention, it is preferable that the reflection mirror and an electric discharge section of the electric discharge lamp be disposed at positions having roughly the same height in the thickness direction of the elliptical resonator. With this configuration, it is possible to allow the emission light emitted at the electric discharge section of the electric discharge lamp to be efficiently incident on the reflection mirror so that the usage efficiency of the light can be improved and the emission light with high intensity can be obtained.

Further, in addition, in the light source device according to the first aspect of the invention, it is preferable that a tip portion of the power supply antenna and the electric discharge section of the electric discharge lamp be disposed at positions having roughly the same height in the thickness direction of the elliptical resonator. With this configuration, it is possible to allow the microwave supplied in the elliptical resonator from the power supply antenna to be efficiently concentrated to the electric discharge lamp (electrode).

Further, in addition, in the light source device according to the first aspect of the invention, it is preferable that a length of a part protruding in the elliptical resonator of the power supply antenna be roughly the same as one-fourth of a wavelength of the microwave. With this configuration, since a transmission efficiency of the microwave is enhanced, the microwave with high energy can be supplied to the inside of the elliptical resonator.

Further, in addition, in the light source device according to the first aspect of the invention, the radiation exit is preferably an open portion formed on the wall portion or a window section made of a transparent member. With this configuration, since the radiation exit is the open portion formed on the wall portion or the window section made of the transparent member, the emission light of the electric discharge lamp can be efficiently output from the elliptical resonator. By forming the window section by the transparent member, it is possible to prevent dust or foreign materials from entering the inside of the elliptical resonator.

Further, in addition, in the light source device according to the first aspect of the invention, a diameter of the radiation exit is preferably one-fourth or less of a wavelength of the microwave. With this configuration, it is possible to prevent the microwave in the elliptical resonator from leaking to the outside from the radiation exit so that high reliability of the light source device can be assured.

Further, in addition, in the light source device according to the first aspect of the invention, it is preferable that a shield member for blocking the microwave is provided at the radiation exit. With this configuration, it is possible to prevent the microwave from leaking irrespective of the diameter of the radiation exit so that the radiation exit with the diameter having a desired size can be provided.

Further, in addition, in the light source device according to the first aspect of the invention, the shield member is preferably a grating member having an interval of one-fourth or less of a wavelength of the microwave. With this configuration, it is possible to surely prevent the microwave supplied to the inside of the elliptical resonator from leaking by passing through the shield member.

According to a second aspect of the invention, a projector includes the above described light source device. With this configuration, the projector is equipped with the light source device capable of generating high intensity, stable emission light by low energy so that it is possible to provide the high quality projector.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
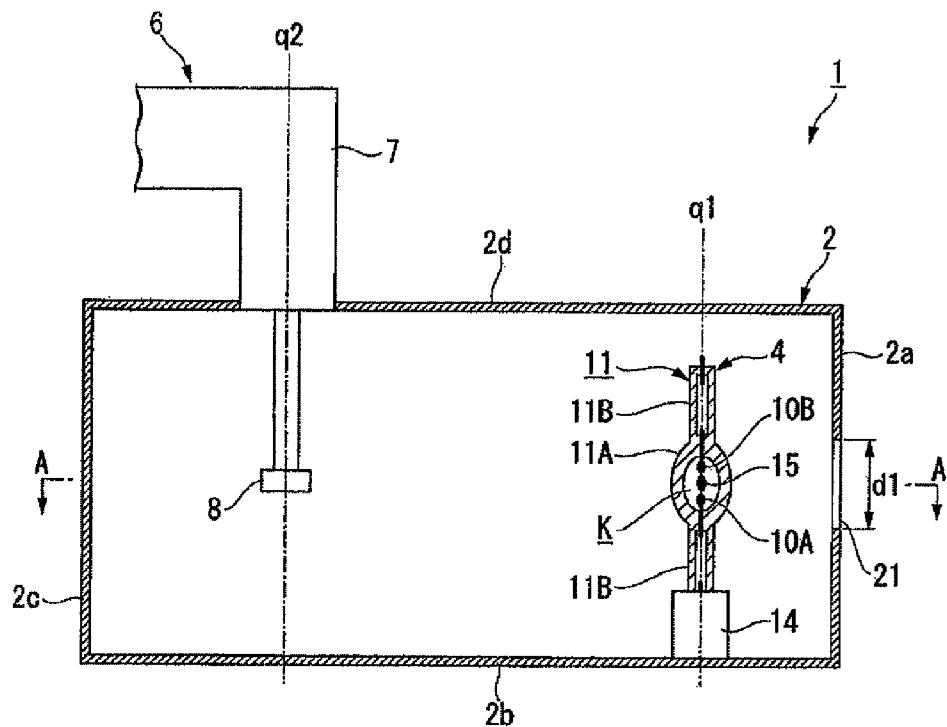
FIG. 1 is a side view showing a schematic structure of a light source device according to a first embodiment of the invention.

The preferred embodiments according to the invention will be described with reference to the accompanying drawings. It should be noted that different scales are used for elements and members in the drawings so that the elements and members can be recognized.

First Embodiment

Figure 2:
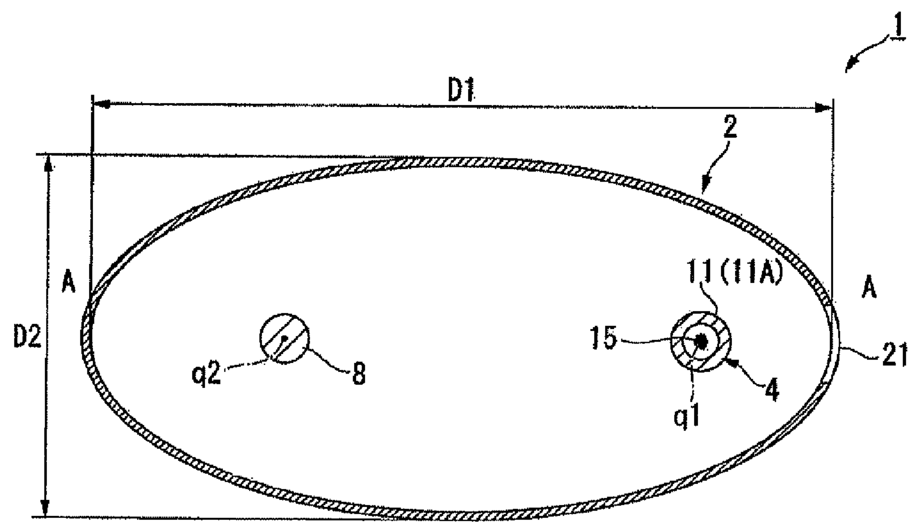
FIG. 2 is a cross sectional view of the light source device taken along a line A-A according to the first embodiment of the invention.

FIG. 1 is a side view showing an entire structure of a light source device of a first embodiment according to the invention. FIG. 2 is a cross sectional view of the light source device taken along a line A-A in FIG. 1. As shown in FIG. 1 and FIG. 2, the light source device 1 of the embodiment is mainly constituted by an elliptical resonator 2, an electric discharge lamp 4, and a microwave power supply section 6. In two confocal points in the elliptical resonator 2, a first focal point q1 is provided with the electric discharge lamp 4 and a second focal point q2 is provided with a power supply antenna 8 of the microwave power supply section 6. The light source device 1 according to the embodiment is configured to correspond to a microwave in a 2.45 GHz band (high frequency electromagnetic wave).

The electric discharge lamp 4 is equipped with an electric discharge tube 11 made of quartz glass and a pair of electrodes 10A and 10B connected to the electric discharge tube 11. The electric discharge tube 11 is constituted by an expansion portion 11A expanded in a spherical shape at a central part and sealing sections 11B and 11B extending both sides of the expansion portion 11A. A discharge space K having a roughly spherical shape is formed in the expansion portion 11A. A light emitting material for generating light by being excited by energy of the microwave resonated in the elliptical resonator 2, is encapsulated in the discharge space K. A kind of the light emission material is selected for convenience depending on a desired wavelength (frequency) to be generated by the electric discharge lamp 4. In the embodiment, 3 mg mercury is encapsulated in the tube.

The electrodes 10A and 10B are adapted to guide the microwave, and are disposed such that end portions thereof are separated from each other. Each of the electrodes 10A and 10B is preferably made of a conductive material particularly having a small thermal expansion coefficient and a high heat resistance. To be specific, tungsten alloy, stainless steel alloy or molybdenum is suitable for the material. In order to cancel a difference in the thermal expansion between the electrode and the quartz glass, a part of the electrode is made to be a foil.

The electric discharge lamp 4 is fixed to a wall portion 2*b* of the elliptical resonator 2 by means of a lamp support body 14 under a condition that the electric discharge lamp 4 is placed in a vertical posture such that the extending direction of the pair of electrodes 10A and 10B is coincident with the thickness direction of the elliptical resonator 2.

The elliptical resonator 2 is a cavity resonator for resonating the microwave supplied from the microwave power supply section 6. The elliptical resonator 2 having a predetermined thickness is so constituted that a length D1 in a long diameter direction is 180 mm and a length D2 in a short diameter is 120 mm. The elliptical resonator 2 is formed of a metallic material such as copper or aluminum. A radiation exit 21 for radiating the emission light of the electric discharge lamp 4 to the outside is formed at the wall portion 2*a* of the elliptical resonator 2.

The radiation exit 21 is provided at a position having a height roughly the same as that of an electric discharge section 15 of the electric discharge lamp 4 (the expansion portion 11A of the electric discharge tube 11) in the thickness direction of the elliptical resonator 2. A diameter d1 of the radiation exit is in a dimension whereby the microwave resonated in the elliptical resonator 2 does not leak, and is specifically set to be one-fourth or lower of the wavelength λ, of the microwave (i.e., approximately 30 mm or lower). In addition, regarding a dust-proof measure for preventing dust or foreign materials from entering the inside of the elliptical resonator 2, an open portion of the radiation exit 21 can be closed by a light transmissive member.

The microwave power supply section 6 is equipped with a coaxial tube 7 for guiding a high frequency signal output from a microwave generation source (not shown) and the power supply antenna 8 for supplying the microwave in the elliptical resonator 2. The power supply antenna 8 is perpendicularly inserted into the inside of the elliptical resonator 2 from the wall portion 2*d* so as to be projected to the inside and the extending direction is coincident with the extending direction of the pair of electrodes 10A and 10B of the electric discharge lamp 4.

The power supply antenna 8 has a length roughly equal to one-fourth of the wavelength of the microwave (approximately 30 mm) in order to enhance a transmission efficiency of the microwave so that a high frequency electric power with high energy can be supplied. In addition, the power supply antenna 8 is disposed such that the height of the tip portion of the power supply antenna 8 is roughly the same as that of the electric discharge section 15 of the electric discharge lamp 4 in the thickness direction of the elliptical resonator 2. As a result, the microwave supplied from the tip portion can be efficiently concentrated to the electric discharge lamp 4 in which the light emission material is encapsulated.

In the light source device 1 having the above structure, when the microwave having a predetermined frequency is supplied to the inside of the elliptical resonator 2 from the power supply antenna 8 disposed at the second focal point q2 in the two confocal points of the elliptical resonator 2, the microwave is resonated in the inner space of the elliptical resonator 2 and the energy of the resonated microwave is concentrated to the electric discharge lamp 4 disposed at the first focal point q1. Under the above condition, the light emission material in the electric discharge lamp 4 is excited by the energy of the concentrated microwave so as to generate the light. The emission light from the electric discharge lamp 4 is radiated to the outside of the elliptical resonator 2 through the radiation exit 21.

Next, light emission characteristics of the light source device of the embodiment and an existing light source device are compared with each other. As an electric discharge lamp to be used in each of the light source devices, high pressure mercury lamps including 3 mg mercury were respectively prepared. A frequency of a microwave to be supplied was 2.45 GHz and a supply power thereof was 100 W.

In a case of the light source device 1 having the elliptical resonator 2 of the embodiment, when the microwave with the frequency of 2.45 GHz was applied to the power supply antenna 8 so as to supply electric power of 100 W to the electric discharge lamp 4, a result in which a total luminous flux value is 6100 lm and a luminance efficiency is 61 lm/W was obtained. When the emission state at that time was observed, stable emission of light without flickering was obtained at the gap between the electrodes 10A and 10B, i.e., electric discharge section 15 of the electric discharge lamp 4 and occurrence of a luminance point which was observed in arc discharge was not observed.

On the other hand, in a case where the existing light source device using a cylinder type resonator was driven under a condition the same as that of the embodiment, a luminance efficiency of the electric discharge lamp was 40 lm/W.

Therefore, as long as the light source device has the elliptical resonator 2 of the embodiment, it is revealed that the emission light with higher intensity can be obtained as compared to the light source device having the existing cylindrical resonator even when using energy having the same level.

Since the light source device 1 of the embodiment is so constituted that the power supply antenna 8 is disposed at the second focal point q2 of the elliptical resonator 2 and the electric discharge lamp 4 is disposed at the first focal point q1, the microwave resonated in the elliptical resonator 2 can be efficiently concentrated to the electric discharge lamp 4. Namely, the microwave radiated from the power supply antenna 8 is resonated in the elliptical resonator 2 and is concentrated to the electric discharge lamp 4 disposed at the other confocal point. An electric field mode at that time is set to a TE mode so that the electrodes 10A and 10B provided on the electric discharge lamp 4 can efficiently receive an electromagnetic field.

With the above configuration, the usage efficiency of the microwave can be improved and the emission light with high intensity can be obtained by energy having a level the same as heretofore. As the microwave is concentrated to the electric discharge lamp 4 (the electric discharge section 15) having the light emission material encapsulated therein, the electric discharging can be stabilized and the light emission state more stable than heretofore can be obtained. Consequently, the light source device is suitable for a projector described later.

In the following descriptions of each embodiment, an item different from that in the first embodiment is described in detail and an item common thereto is not described. In addition, in each of drawings used for the descriptions, each structural element common to that in FIG. 1 or FIG. 2 is denoted by the same numeral as in FIG. 1 or FIG. 2.

Second Embodiment

Figure 3:
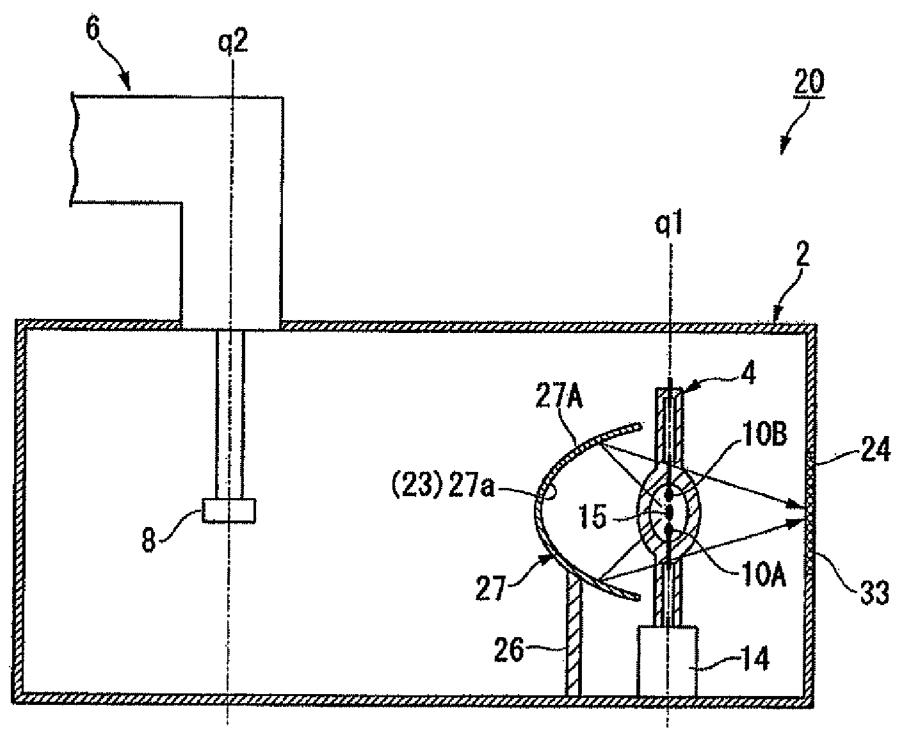
FIG. 3 is a side view showing a schematic structure of the light source device according to a second embodiment of the invention.

Next, a second embodiment according to the invention is described with reference to FIG. 3. FIG. 3 is a side view showing an entire structure of a light source device 20 of the second embodiment. While a basic structure of the light source device 20 of the embodiment described below is roughly the same as that in the first embodiment, a different point between them is that a reflector 27 is provided in the vicinity of the electric discharge lamp 4.

The light source device 20 of the embodiment is equipped with the reflector 27 (a reflection mirror) that reflects a light flux emitted from the electric discharge lamp 4 toward a radiation exit 24 provided on the wall portion 2*a* of the elliptical resonator 2. The reflector 27 is made of glass and has a curved reflection section 27A as a main part. A dielectric multi-layer film 23 is formed on an inner face (a reflection face 27*a*) of the reflection section 27A by vapor deposition such as sputtering. The dielectric multi-layer film 23 constitutes a cold mirror that reflects visible light and transmits infrared light.

The reflector 27 is disposed in the vicinity of the electric discharge lamp 4 so as to make the focal point position of the reflection face 27*a* to a central position (the electric discharge section 15) between the electrodes 10A and 10B under a condition that its open portion faces the expansion portion 11A and the radiation exit 24 of the electric discharge lamp 4. To be specific, as shown in FIG. 3, the reflector 27 is disposed at an inner side rather than the electric discharge lamp 4 in the elliptical resonator 2 and is disposed at roughly the same height as those of the expansion portion 11A (the electric discharge section 15) and the radiation exit 24 so as to face the radiation exit 24 with the electric discharge lamp 4 therebetween. By providing the reflector 27 having the above structure, the emission light emitted from the electric discharge lamp 4 can be radiated through the radiation exit 24 in such a manner that the radiation directions of beams of the emission light are aligned so that a point light source with high intensity can be obtained.

In addition, a metallic mesh 33 is provided at an open portion of the radiation exit 24. The metallic mesh 33 is made of a grating member having an interval of one-fourth or less of the wavelength of the microwave so as to function as a shield member for blocking the microwave. The metallic mesh 33 prevents the microwave resonated in the elliptical resonator 2 from being transmitted to the outside. By providing the metallic mesh 33 at the radiation exit 24, a dimension of a diameter d2 of the radiation exit 24 can be arbitrarily set. As a result, even when the dimension of the diameter d2 is set to be larger than one-fourth of the wavelength of the microwave in order to increase a take-out efficiency of the light of the lamp, the metallic mesh 33 can prevent the microwave from leaking.

Third Embodiment

Figure 4:
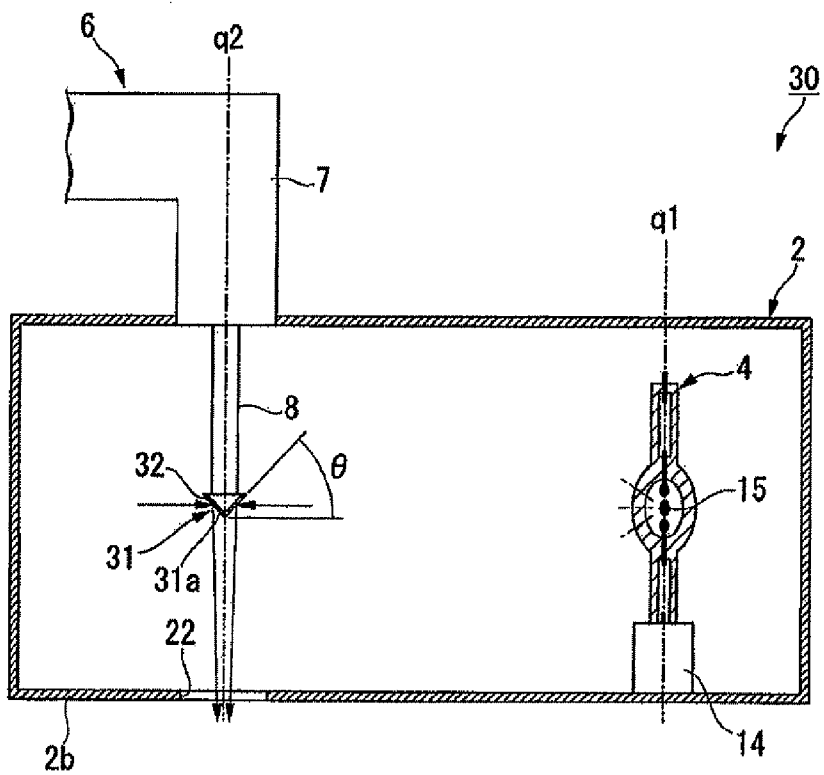
FIG. 4 is a side view showing a schematic structure of the light source device according to a third embodiment of the invention.

Next, a third embodiment according to the invention is described with reference to FIG. 4. FIG. 4 is a side view showing an entire structure of a light source device of the third embodiment. In a light source device 30 of the embodiment, a reflection mirror 31 is provided at a tip portion of the power supply antenna 8, which is different from the first embodiment.

The reflection mirror 31 is provided at the tip portion of the power supply antenna 8 and can be independent from or integrated with the power supply antenna 8. The reflection mirror 31 is formed in a tapered shape and a reflection film 32 of an evaporated film of aluminum oxide ($Al_2O_3$) is formed on its circumference surface 31*a*. In the embodiment, a taper angle θ of the reflection mirror 31 is set to be 45 degrees. Note that the taper angle of the reflection mirror 31 is not limited to the above.

The reflection mirror 31 is disposed at a position having roughly the same height as that of the electric discharge section 15 of the electric discharge lamp 4 disposed at the first focal point q1 under a condition that a top of a cone is made to face the wall section 2*b* of the elliptical resonator 2.

When the light source device 30 having the above structure is driven, the microwave radiated from the power supply antenna 8 is resonated in the elliptical resonator 2 and is concentrated to the electric discharge lamp 4 disposed at the first focal point q1. On the other hand, the emission light of the electric discharge lamp 4 emitted by energy of the microwave is concentrated to the second focal point q2 different from the case of the microwave. The emission light of the electric discharge lamp 4 concentrated to the second focal point q2 is reflected toward the radiation exit 22 by the reflection film 32 provided at a circumference surface 32*a* of the reflection mirror 31 and is radiated to the outside through the radiation exit 22.

According to the light source device 30 of the embodiment, by utilizing the concentration of light to the confocal point generated by the use of the elliptical resonator 2, it is possible to increase the usage efficiency of the light of the lamp. In addition, by adjusting the taper angle θ of the reflection mirror 31, it is possible to surely reflect the light to a desired direction (toward the radiation exit provided at a desired position).

Fourth Embodiment

Figure 5:
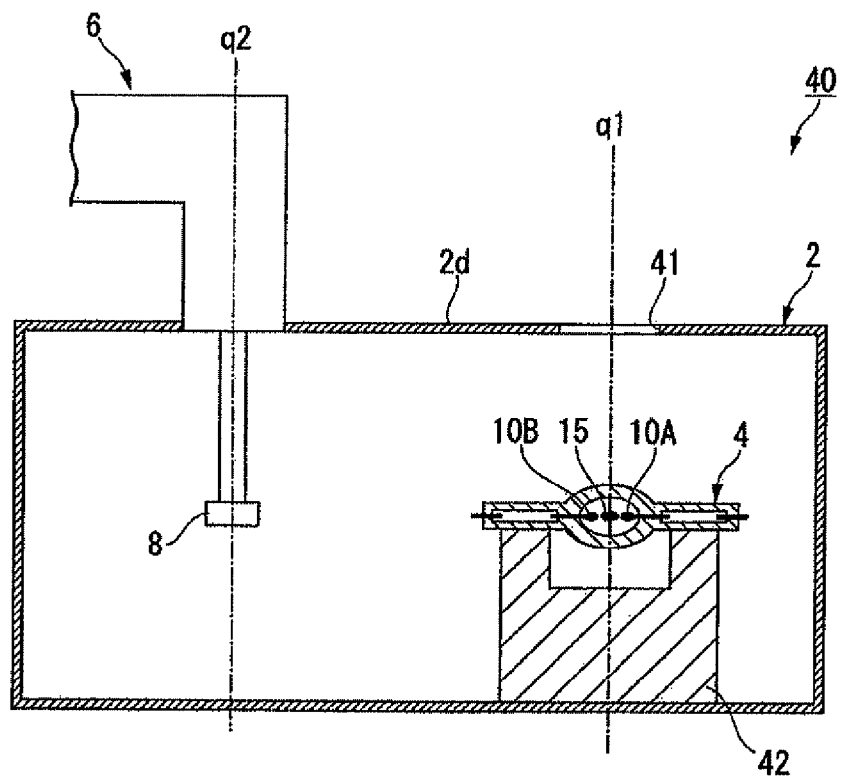
FIG. 5 is a side view showing a schematic structure of the light source device according to a fourth embodiment of the invention.

Next, a fourth embodiment according to the invention is described with reference to a FIG. 5. FIG. 5 is a side view showing an entire structure of a light source device of the fourth embodiment. In a light source device 40 of the embodiment, the electric discharge lamp 4 is transversely disposed, which is different from the above embodiments. While the extending direction of the electrodes 10A and 10B of the electric discharge lamp 4 is coincident with the protruding direction of the power supply antenna 8 in each of the above embodiments, the electric discharge lamp 4 is transversely disposed by using a support body 42 such that the extending direction of the electrodes 10A and 10B is perpendicular to the extending direction of the power supply antenna 8 in this embodiment. Here, the vertical positions of the power supply antenna 8 and the electrodes 10A and 10 B of the electric discharge lamp 4 are made to be coincident with each other in the thickness direction of the elliptical resonator 2. In the elliptical resonator 2, a radiation exit 41 is provided at the wall portion 2*d* on an extending line of the second focal point q2, and the emission light from the electric discharge lamp 4 is radiated to the outside through the radiation exit 41.

Also, in the embodiment, the microwave radiated from the power supply antenna 8 positioned on the second focal point q2 can be efficiently concentrated to the electric discharge lamp 4 (the electric discharge section 15) disposed at the first focal point q1 so that the stable emission light can be obtained. With this configuration, the usage efficiency of energy can be improved and the emission light with high intensity can be obtained by energy having a level the same as heretofore.

Figure 6:
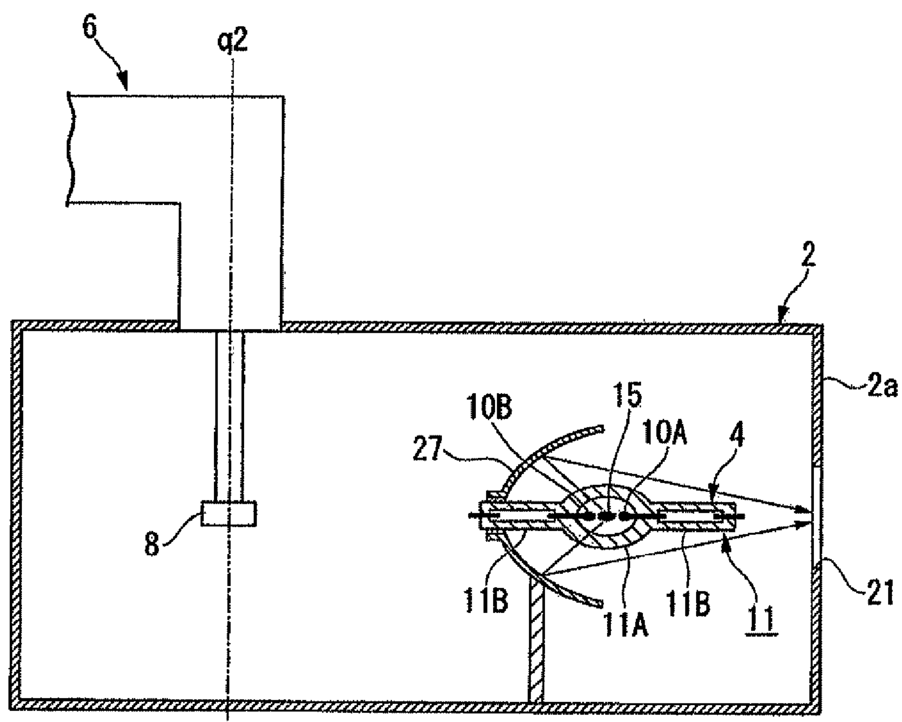
FIG. 6 is a side view showing a modified light source device.

In addition, as shown in FIG. 6, the reflector 27 can be attached to one of the sealing sections 11B of the electric discharge lamp 4 (the sealing section 11B positioning at the central side of the resonator 2). In this case, the radiation exit 21 is provided at the wall portion 2*a* of the elliptical resonator 2 on a line connecting the tip portion of the power supply antenna 8 to the electric discharge section 15 of the electric discharge lamp 4. Note that the installation condition of the electric discharge lamp 4 in the elliptical resonator 2 can be selected in consideration of built-in of the electric discharge lamp 4 to a projector described later.

Projector

Figure 7:
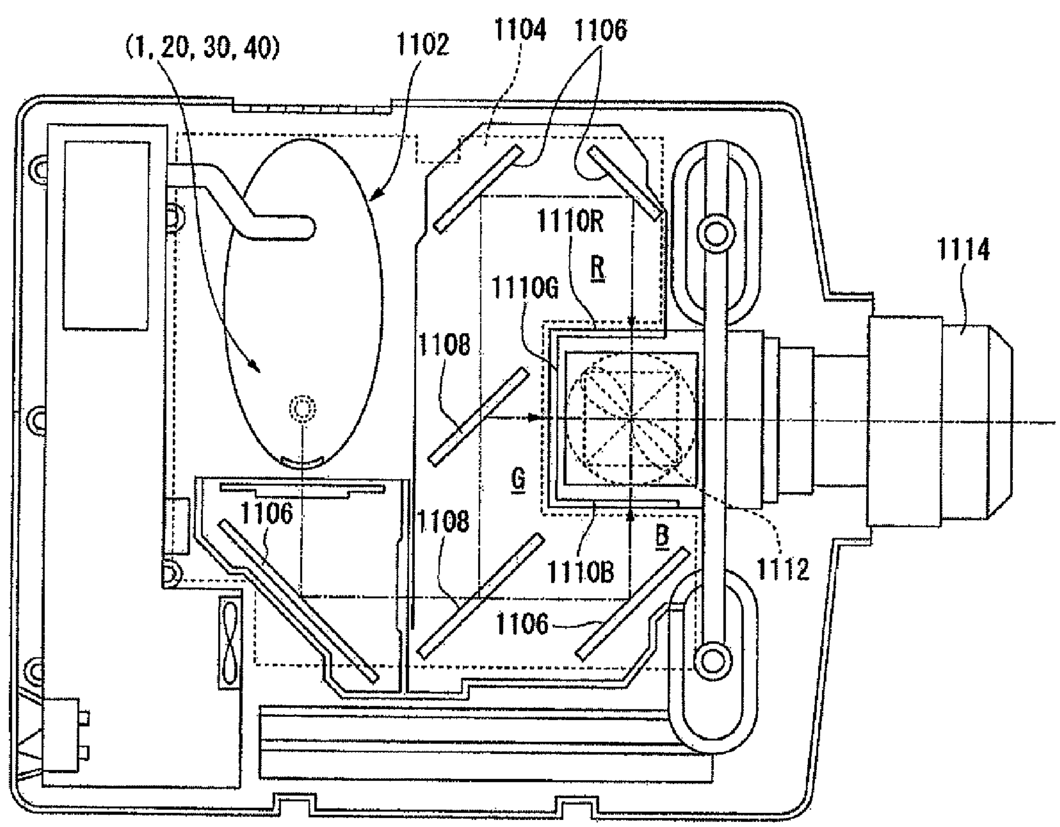
FIG. 7 is a schematic view showing a structure of a projector according to the invention.

Next, a projector with the use of the light source device of the above embodiment is described below. FIG. 7 is a plan view showing a structural example of the projector. As shown in FIG. 7, a lamp unit 1102 having the above described light source device according to the invention 1 is provided in a projector 1100. Instead of the light source device 1, either one of the light source devices 20, 30 and 40 according to the invention can be used in the lamp unit 1102. Projection light emitted from the lamp unit 1102 is separated into light beams of three primary colors of R, G and B by means of four mirrors 1106 and two dichroic mirrors 1108 provided in a light guide 1104 and the light beams are made to be incident on respective liquid crystal panels (a light modulation sections) 1110R, 1110B and 1110G as light valves respectively corresponding to the three primary colors.

The liquid crystal panels 1110R, 1110B and 1110G are configured to be respectively driven by signals of primary colors of R, G and B supplied from an image signal processing circuit. The light beams respectively modulated by the liquid crystal panels 1110R, 1110B and 1110G are made to be incident on dichroic prisms 1112 from three directions. At the dichroic prism 1112, the light beams of colors of R and B are deflected by 90 degrees, but the light beam of color of G travels straight. Therefore, the images of three colors are synthesized so that a color image is projected on a screen through a projection lens 1114 (a projection unit). Here, by paying attention to the display images by the respective liquid crystal panels 1110R, 1110B and 1110G, the display image by the liquid crystal panel 1110G should be mirror-reversed with respect to the display images by the liquid crystal panels 1110R and 1110B.

The projector 1110 is equipped with the light source device of the above embodiment. Since the light source device of which devitrification is suppressed for a long time period is used, illumination light with high intensity can be radiated for a long time period. As a result, the life of the projector 1100 can be extended and a projection image having high display quality and high reliability can be obtained. In addition, since the projector 1100 is equipped with the small light source device 1, the entirely miniaturized, light weight projector can be achieved.

In the projector 1100 of the embodiment, the liquid crystal panel is used as a light modulation section. However, in general, there are no restrictions on the light modulation section as long as it can modulate input light in accordance with image information so that, for example, a micro mirror type light modulation device can be used. Meanwhile, as the micro mirror type light modulation device, for example, a DMD (Digital Micro mirror Device) (Registered trademark) can be used. Note that in a case where the micro mirror type light modulation device is used, the need of an entrance polarization plate or an exit polarization plate can be obviated and the need of a polarization conversion element can be obviated.

The light source device described above is used in the transmission type liquid crystal projector 1100. However, the projector is not limited to the above described one. Even when the light source device is used in a reflection type liquid crystal projector, e.g., an LCOS (Liquid Crystal On Silicon) type projector, similar effect can be achieved.

A three-plate type unit with the use of three liquid crystal panels or a single plate type unit with the use of single liquid crystal panel can be used in the light modulation section of the above embodiment. Note that in a case where the single plate type unit is used, the need of a color separation optical system or a color synthesis optical system can be obviated.

In addition, the light source device is suitable for a front type projector that projects an optical image on a projection face placed at the outside of the light source device. However, it is not limited to the above, the light source device can be adopted to a rear type projector that has a screen provided therein and projects an optical image on the screen.

As in the above, the preferable embodiments are described with reference to the drawings. It is needless to say that the invention is not limited to the embodiments, and the embodiments can be combined with each other. It is clear that various modifications or changes can be made by those skilled in the art within the spirit and scope of the invention defined in the claims. Such modifications or changes are also included in the technical range of the invention.

For example, in the light source devices 1, 20 30 and 40 in the above described embodiments, a microwave power source or an alternate current (AC) power source can be used.

In addition, each of the light source devices 1, 20, 30 and 40 in the embodiments is suitable for a light source device of a projector. However, it is not limited to the above configuration. The miniature, light-weight light source device can be adopted to any other optical devices. In addition, the light source device of the invention can be preferably adopted to an illumination device for an air craft, a ship or a vehicle, or an interior lighting device.

What is claimed is:

1. A light source device, comprising:

an elliptical resonator;

an electric discharge lamp that has an electric discharge tube and an electrode connected to the electric discharge tube and is disposed at one of two confocal points of the elliptical resonator; and a power supply antenna that supplies a microwave to the electric discharge lamp and is disposed at the other confocal point.

2. The light source device according to claim 1, wherein, a radiation exit for radiating emission light of the electric discharge lamp to the outside of the elliptical resonator is formed on a wall portion of the elliptical resonator.

3. The light source device according to, claim 2 further comprising:

a reflection mirror that reflects the emission light of the electric discharge lamp toward the radiation exit and is provided in the elliptical resonator.

4. The light source device according to claim 3, wherein, the reflection mirror is formed in a cone shape so as to be opened toward the electric discharge lamp and the radiation exit.

5. The light source device according to claim 3, wherein, the reflection mirror is disposed at the same confocal point as that of the power supply antenna.

6. The light source device according to claim 5, wherein, the radiation exit is formed on the wall portion at the same confocal point as that of the reflection mirror and the power supply antenna, and the reflection mirror has a tapered reflection face for reflecting the emission light toward the radiation exit.

7. The light source device according to claim 3, wherein, the reflection mirror and an electric discharge section of the electric discharge lamp are disposed at positions having roughly the same height in the thickness direction of the elliptical resonator.

8. The light source device according to claim 3, wherein, a tip portion of the power supply antenna and an electric discharge section of the electric discharge lamp are disposed at positions having roughly the same height in the thickness direction of the elliptical resonator.

9. The light source device according to claim 1, wherein, a length of a part protruding in the elliptical resonator of the power supply antenna is roughly the same as one-fourth of a wavelength of the microwave.

10. The light source device according to claim 2, wherein, the radiation exit is preferably an open portion formed on the wall portion or a window section made of a transparent member.

11. The light source device according to claim 10 wherein, a diameter of the radiation exit is preferably one-fourth or less of a wavelength of the microwave.

12. The light source device according to claim 10, wherein, a shield member for blocking the microwave is provided at the radiation exit.

13. The light source device according to claim 12, wherein, the shield member is preferably a grating member having an interval of one-fourth or less of a wavelength of the microwave.

14. A projector comprising the light source device according to claim 1.

* * * * *